D. T. PITKETHLY & H. L. BAIER.
VEHICLE SIGNAL DEVICE.
APPLICATION FILED DEC. 27, 1915.
1,280,831.
Patented Oct. 8, 1918.
2 SHEETS—SHEET 1.
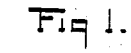
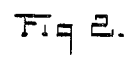
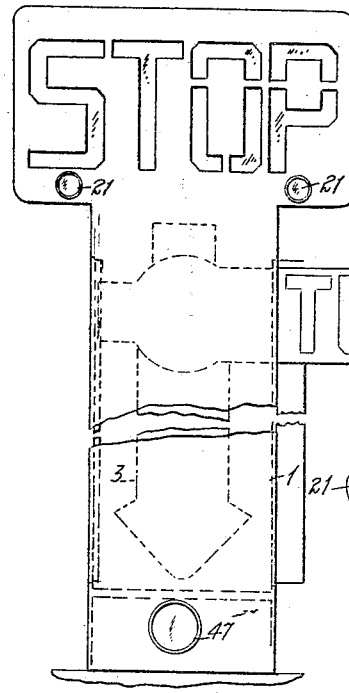
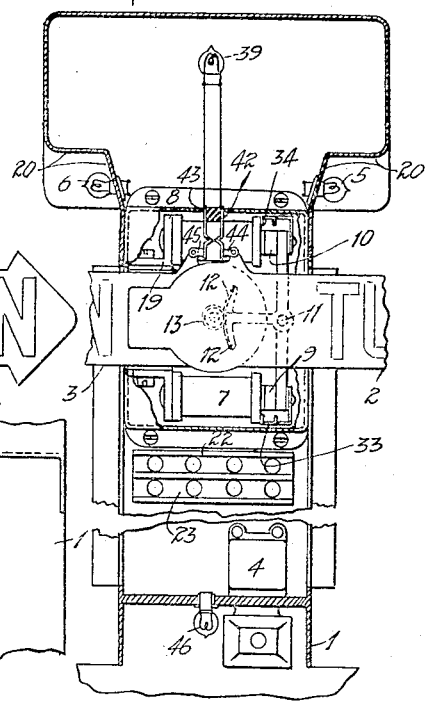
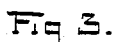
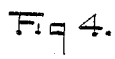
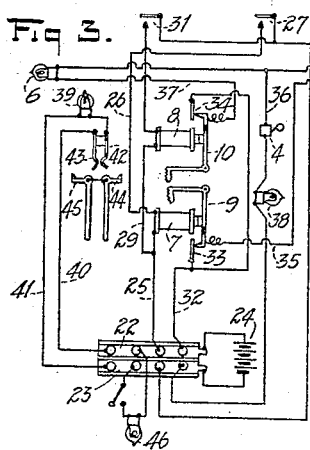
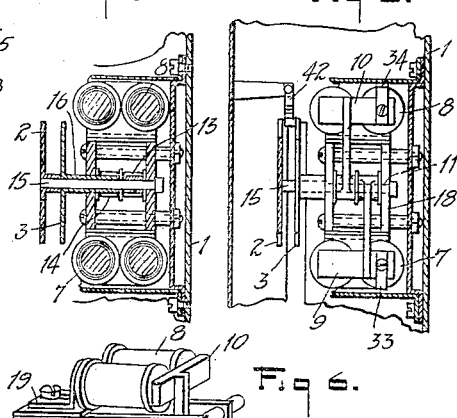

D. T. PITKETHLY & H. L. BAIER.
VEHICLE SIGNAL DEVICE.
APPLICATION FILED DEC. 27, 1915.
1,280,831.
Patented Oct. 8, 1918.
2 SHEETS—SHEET 2.
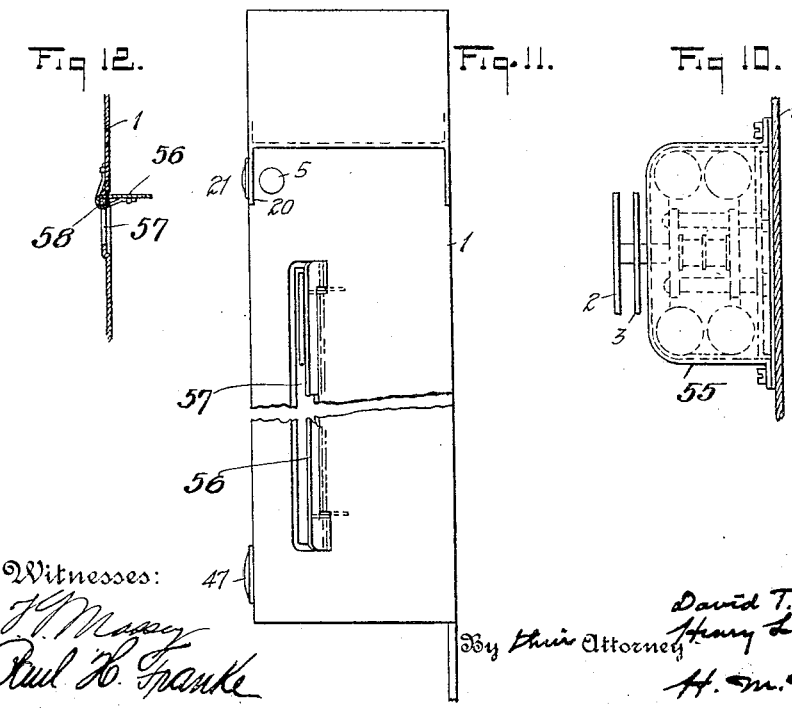

UNITED STATES PATENT OFFICE.

DAVID T. PITKETHLY AND HENRY L. BAIER, OF BROOKLYN, NEW YORK; SAID HENRY L. BAIER ASSIGNOR TO LUDWIG BAIER, OF BROOKLYN, NEW YORK.

VEHICLE-SIGNAL DEVICE.

1,280,831.  Specification of Letters Patent.  Patented Oct. 8, 1918.

Application filed December 27, 1915. Serial No. 68,633.

*To all whom it may concern:*

Be it known that we, DAVID T. PITKETHLY and HENRY L. BAIER, citizens of the United States of America, and both residents of the borough of Brooklyn, city of New York, county of Kings, and State of New York, have invented certain new and useful Improvements in Vehicle-Signal Devices, of which the following is a specification.

Our invention relates to vehicle signal devices, particularly devices for indicating intended direction of turn or intended stop of the vehicle, and comprises a plurality of semaphore arms or the like adapted to be displayed in one direction or another to indicate the direction of turn, together with novel operating devices for such semaphore arms, novel means operating suitable signal lamps, and other features as hereinafter described and particularly pointed out in the appended claims.

The objects of our invention are to devise a vehicle signal device which shall be simple, compact, not expensive in construction, and which shall indicate both direction of intended turn and intended stop in a manner to be instinctively recognized. Other objects of our invention will appear hereafter.

We will now proceed to describe our invention with reference to the accompanying drawings, and will then point out the novel features in claims. In the drawings:

Figure 1 shows an elevation of our signal device with one semaphore arm displayed.

Fig. 2 shows a vertical transverse section of the signal device on a plane parallel to that of Fig. 1.

Fig. 3 is a diagram showing the electrical circuits of the apparatus.

Fig. 4 shows a vertical axial section through the axis of the pinion shaft of Fig. 2.

Fig. 5 shows a vertical section on a plane to the right of the magnets and armatures of Fig. 2.

Fig. 6 shows a perspective elevation of the main portions of the mechanism for actuating the signal arms.

Fig. 7 is a detail fragmentary side elevation of a portion of the signal device.

Fig. 8 is a top view of an operating switch which may be employed, and Fig. 9 is a central vertical section of such switch.

Fig. 10 shows a side elevation of the interior mechanism box; Fig. 11 shows a side elevatiton of the signal device, showing particularly one of the shutters; and Fig. 12 shows a fragmentary horizontal section of one side of the case, indicating the hinge construction for the shutters.

The signal device herein illustrated and described is particularly intended for use on motor vehicles as a rear signal device, but is not limited to use on motor vehicles, nor to use as a rear signal device of motor vehicles, since it may be placed elsewhere than on the rear of such a vehicle. It comprises a case 1 within which are mounted a plurality of semaphore arms or equivalent indicating devices, 2 and 3, normally concealed within the case 1, but adapted to be displayed, one on one side of the case, the other on the other side of the case, to indicate direction of turn; and as hereinafter described, we have provided means for displaying both of such semaphores simultaneously, for indicating stop; though preferably we supplement such stop signal by displaying also and simultaneously, the word Stop, the upper portion of the case being provided with a translucent lettered sign, adapted to be illuminated, containing the word Stop. We also preferably provide an audible signal device (bell, buzzer, horn, etc.) 4 which is caused to sound when either or both of the semaphores are displayed, thereby attracting the attention of persons in the vicinity particularly those who are following the vehicle. In the drawings such audible signal device is indicated as an electric bell. We also preferably provide electric lamps 5 and 6 for illuminating semaphores 2 and 3 respectively when displayed, which lamps may also form visual signal devices to attract the attention of persons within the range of vision of the signal device, and also to indicate the direction of turn, particularly at night; though in some cases we also provide other luminous signal means than the said lamps 5 and 6.

Semaphore 2 is arranged to be elevated into display position by a magnet 7; and semaphore 3 is arranged to be raised similarly to display position by a magnet 8. The mechanism by which these two magnets operate their respective semaphores are similar and comprise an armature 9 for magnet 7 and an armature 10 for magnet 8, both pivoted upon a common shaft 11 and each carrying a gear sector 12 intermeshing with a corresponding pinion. The pinion, 13, for armature 9 and semaphore 2 is mounted upon a shaft 15 (see Fig. 4), the corresponding semaphore 2 being secured to that shaft. The pinion 14 for armature 10 and semaphore 3 is mounted upon a sleeve 16 surrounding and movable with respect to shaft 15, the semaphore 3 being secured to that sleeve. Since energization of magnet 7 causes its gear sector 12 to move upward, it is clear that such movement will cause semaphore 2 to move upward to the right of Figs. 1 and 2; deënergization of such magnet permitting the semaphore 2 to drop. Similarly, since the energization of magnet 8 causes its gear sector to move down, it will be clear that such motion will cause the semaphore 3 to be displayed to the left; and upon deënergization of said magnet 8 the semaphore 3 will drop by gravity.

Conveniently, the magnets 7 and 8 are supported by a frame, shown in Fig. 6, which frame is secured to the back of the case 1; said frame comprising two frame members 17 and 18 connected by suitable posts and having adjustable brackets 19 to which the magnets are secured. The adjustability of these brackets permits the magnets to be moved back and forth with respect to their armatures, so adjusting the action of the mechanism. The armatures, the shaft 15 and the sleeve 16 have bearings in this frame. This frame carrying the armatures and the magnets constitutes a unitary structure removable intact from the case. It is extremely easy to assemble the operating mechanism for the semaphores on this frame and then insert same complete into the case.

Reflectors 20 are provided, in connection with the lamps 5 and 6, for reflecting the light of those lamps downward to illuminate the semaphores 2 and 3. In the front of the case (which front is usually a hinged door) may be provided small colored bull's-eyes or lenses 21, about opposite said lamps 5 and 6, whereby when one of the lamps is illuminated the corresponding bull's-eye 21 will also be illuminated to attract the attention of persons for whom the signal is intended.

In Fig. 3 we have indicated diagrammatically the circuits of the device. 22 and 23 designate bus bars or electrical terminals to which the battery or other source of current 24 may be connected. In the case of a motor vehicle, this battery may be the usual lighting and starter battery of the car. For energizing magnets 7 and 8, there is a circuit conductor 25 leading from bus bar 22 to magnet 7; from which magnet a conductor 26 leads to a circuit closer 27 (which circuit closer may be any suitable switch adapted to be operated by hand or otherwise); and from this switch 27 a return conductor 28 leads to bus bar 23. A branch conductor 29 leads from conductor 25 to magnet 8, and thence a conductor 30 leads to circuit closer 31 (similar to circuit closer 27) this circuit closer being also connected to return conductor 28. It will be seen that when circuit closer 27 is operated magnet 7 will be energized and its corresponding semaphore raised; and when circuit closer 31 is operated magnet 8 will be energized and its corresponding semaphore raised; and that these two circuit closers 27 and 31 may be operated together, so raising both semaphores.

For operating the signal lights 5 and 6 which illuminate the semaphore arms 2 and 3, we have illustrated the employment of contact means operated by the semaphore operating mechanism itself. A circuit conductor 32 extends to a contact point 33 associated with magnet 7 and thence to a contact point 34 associated with magnet 8. The armature 9 of magnet 7 is arranged to make contact with contact member 33 when such armature is attracted, and from said armature a conductor 35 extends to lamp 5, and thence through a common return conductor 36 to the bus bar 23. From the armature 10 of magnet 8 a conductor 37 similarly extends to lamp 6, which lamp is also connected to the common return conductor 36. It will be seen that when armature 9 is attracted, lamp 5 will be illuminated, and that when armature 10 is attracted lamp 6 will be illuminated. The audible signal device 4 is commonly placed in this common return conductor 36 so that said audible signal is operated when either of the armatures 9 or 10 is attracted; and sometimes we also place in this common return conductor a further signal lamp 38, placed in some convenient location where it may be seen from the rear, and which has the same significance as the lamps 5 and 6. As indicated in Fig. 1, the upper portion of the case 1 contains letters forming the word "Stop"; these letters being customarily formed on translucent glass or other suitable material, such letters being intended to be illuminated from rear. A lamp 39 is provided for this purpose, and this lamp is in a circuit 40—41 containing contact springs 42 and 43, normally separated, but each arranged to be actuated by a projection 44 or 45 on one of the semaphore arms 2 and 3. When one semaphore arm only is raised the contacts 42 and 43 are not brought together; but when both semaphore arms are raised simultaneously, the two contacts 42 and 43 are brought together, so illuminating the lamp 39.

We commonly provide our signal device with a further lamp 46 which serves to illuminate the tail light 47, and also to illuminate the usual license tag, which tag in practice is suspended from the casing 1.

Figs. 8 and 9 illustrate the switch employed for actuating the semaphores. This switch comprises a base 48 and a switch arm 49. This arm itself forms a contact member which is adapted to make contact at will with either of two contact buttons 50 and 51, which are the same as contact buttons 27 and 31 respectively of Fig. 3. The switch arm 49 is not only pivoted, but is capable of longitudinal motion backward, and when moved backward it will make contact with a contact button 52 and force same into engagement with contact springs 53 and 54 connected respectively to contact buttons 50 and 51.

A switch such as shown in Figs. 8 and 9 is well adapted for location upon the instrument board or upon the steering column of a motor vehicle. In using this switch, the operator for giving a turning signal will move the switch in the direction in which the vehicle is about to turn, so closing the proper contact. This he may do very easily because of the construction of the switch. To give a stop signal he pushes the switch arm 49 backward—an instinctive movement, and one which may be made very readily.

Preferably we inclose the magnets 7 and 8, the frame 17 upon which they are mounted, and the mechanism operated by those magnets, in an interior case 55, which is hermetically sealed except for the aperture through which the shafts 15 and 16 project; and except for an aperture or apertures through which the wiring is carried. This case 55 has been broken away in Figs. 4 and 5, but is shown in Fig. 10. Thereby we protect the magnets, contacts, and the mechanism of the apparatus, from moisture; dust, etc., and thereby protect against the ordinary or more usual causes of derangement.

For a similar reason, we provide shutters 56 which normally close the slots 57 provided for the passage of the semaphore arms through the sides of the case 1. These shutters are actuated by springs 58 tending to hold the shutters in closed position; but when a semaphore is moved toward display position, it forces the shutter open, and holds it open, until, the magnet actuating that semaphore having been deënergized, the semaphore falls, whereupon the shutter closes automatically.

What we claim is:

1. A signal device of the class described, comprising in combination an inclosing case, a mechanism support within said case but removable therefrom, two magnets carried by said support, two armatures, one for each such magnet, having a common pivotal axis, two concentrically arranged shafts having bearings in said support and each provided with a pinion, each of said armatures provided with a gear sector engaging one of said pinions, and signal arms arranged to be operated by said shafts.

2. A signal device of the type described, comprising in combination a case and two signal arms normally therein and concealed thereby, operating mechanism for said signal arms adapted to move same in opposite directions and outwardly from the case to display positions, said case comprising an upper portion projecting laterally above the display positions for said signal arms and containing lamps for illuminating said signal arms when in display position, and provided in such projecting portion with reflectors for reflecting the light of said lamps downward toward such signal arms, and means for illuminating each lamp when its corresponding signal arm is displayed.

In testimony whereof we have signed this specification in the presence of two subscribing witnesses.

DAVID T. PITKETHLY.
HENRY L. BAIER.

Witnesses:
H. M. MARBLE.
PAUL H. FRANKE.

Copies of this patent may be obtained for five cents each, by addressing the "Commissioner of Patents, Washington, D. C."